United States Patent [19]
Freluche et al.

[11] Patent Number: 5,525,437
[45] Date of Patent: Jun. 11, 1996

[54] ELECTROCHEMICAL CELL HAVING A LIQUID ELECTROLYTE AND SPIRAL-WOUND ELECTRODES WITH IMPROVED ELECTROLYTE FILLING

[75] Inventors: Jean-Pierre Freluche, Angouleme; Marc Pierson, Bordeaux, both of France

[73] Assignee: SAFT, Romainville, France

[21] Appl. No.: 362,170

[22] Filed: Dec. 22, 1994

[30] Foreign Application Priority Data

Dec. 23, 1993 [FR] France ............................ 93 15558

[51] Int. Cl.$^6$ .................................................. H01M 8/04
[52] U.S. Cl. ..................... 429/72; 429/51; 429/71; 429/14; 429/81; 429/94; 429/96; 429/100; 429/186; 204/263; 204/275
[58] Field of Search ........................... 429/94, 96, 100, 429/186, 225, 71, 72, 14, 51, 81; 204/263, 275

[56] References Cited

U.S. PATENT DOCUMENTS 4,731,308  3/1988  Goebel et al. ........................ 429/94

OTHER PUBLICATIONS

Patent Abstracts of Japan, vol. 6, No. 77 (E–106) 14 May 1982 & JP–A–57 015 368 (Shin Kobe Electric Mach Co) 26 Jan. 1982.

Patent Abstracts of Japan, vol. 6, No. 136 (E–120) (1014) 23 Jul. 1982 & JP–A–57 060 674 (Shin Kobe Electric Mach Co) 12 Apr. 1982.

Patent Abstracts of Japan, vol. 4, No. 189 (E–39)(671) 25 Dec. 1980 & JP–A–55 131 972 (Shinkoube Denki K.K.) 14 Oct. 1980.

French Search AReport FR 9315558. *No month/yr.—available.

*Primary Examiner*—Bruce F. Bell
*Attorney, Agent, or Firm*—Sughrue, Mion, Zinn, Macpeak & Seas

[57] ABSTRACT

The present invention provides an electrochemical cell having a liquid electrolyte and spiral-wound electrodes provided with an axial chimney for electrolyte filling purposes and placed inside a cylindrical or prismatic enclosure so as to leave a duct between the outside periphery of the spiral-wound electrodes and the inside wall of said enclosure in order to exhaust air displaced by the electrolyte, the cell including a washer disposed between said enclosure and the spiral-wound electrodes at the end of said chimney that is furthest from the electrolyte inlet, said washer being provided with at least one opening putting said chimney into communication with said duct.

8 Claims, 3 Drawing Sheets

FIG. 4    FIG. 5    FIG. 6    FIG. 7
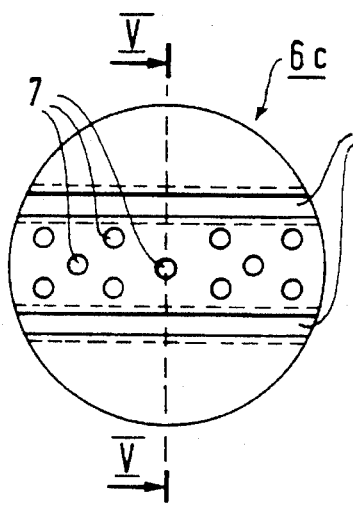 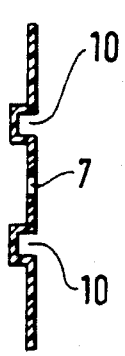 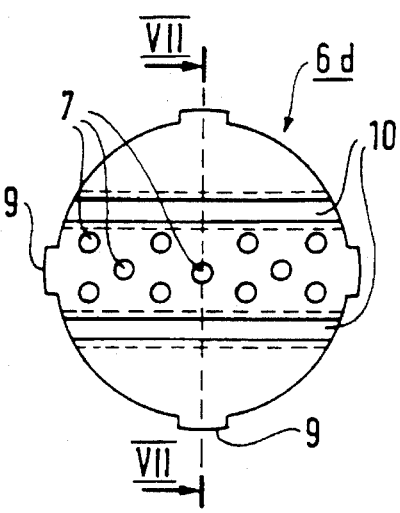 
FIG. 8    FIG. 9    FIG. 10    FIG. 11
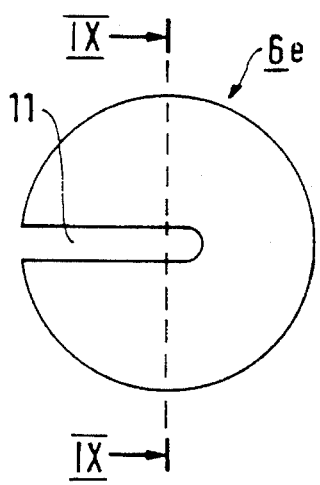 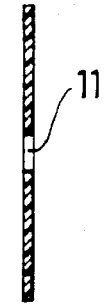 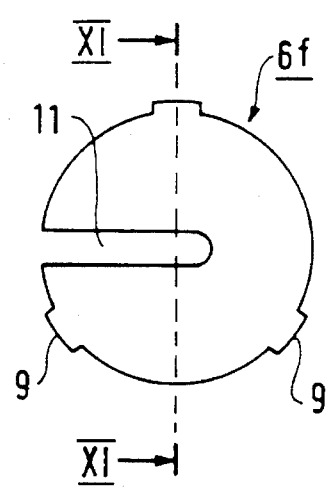 
FIG. 12
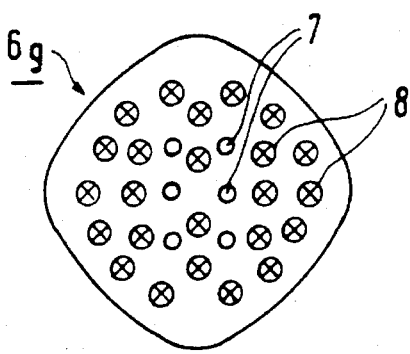

5,525,437

ELECTROCHEMICAL CELL HAVING A LIQUID ELECTROLYTE AND SPIRAL-WOUND ELECTRODES WITH IMPROVED ELECTROLYTE FILLING

The present invention relates to an electrochemical cell having a liquid electrolyte and spiral-wound electrodes inside an enclosure that is cylindrical or prismatic, and also having an axial duct for enabling it to be filled with said electrolyte.

BACKGROUND OF THE INVENTION

It is known that on assembly such cells present highly variable times for absorption of electrolyte by their electrodes because of the way in which air is imprisoned by the electrolyte within the electrodes. To ensure that the electrolyte is completely is absorbed, it therefore becomes necessary to lengthen filling times, but even so it often happens that filling is stopped prematurely because apparent saturation has been observed. This gives rise to pollution of the connections and of the closure of the cell, and also external pollution if excess non-absorbed electrolyte should overflow from the enclosure of the cell. Furthermore, if fresh electrolyte drops onto non-absorbed electrolyte, then splashes occur that can pollute the sealing fillet and the outside surface of the enclosure.

OBJECTS AND SUMMARY OF THE INVENTION

An object of the present invention is to provide an electrochemical cell which is easy to fill completely and quickly with electrolyte and which does not cause pollution of the sealing fillet or of the outside surface of its enclosure.

The present invention provides an electrochemical cell having a liquid electrolyte and spiral-wound electrodes provided with an axial chimney for electrolyte filling purposes and placed inside a cylindrical or prismatic enclosure so as to leave a duct between the outside periphery of the spiral-wound electrodes and the inside wall of said enclosure in order to exhaust air displaced by the electrolyte, the cell including a washer disposed between said enclosure and the spiral-wound electrodes at the end of said chimney that is furthest from the electrolyte inlet, said washer being provided with at least one opening putting said chimney into communication with said duct.

The washer of the invention thus makes it possible to provide a gap between the electrodes and the inside wall of the enclosure, thus putting the axial chimney and the duct into communication and allowing electrolyte and/or expelled air to flow therethrough.

The washer is provided with projections that are preferably directed towards the end of the enclosure. The projections may be constituted by bulges that alternate with holes.

The projections may also be constituted by rectilinear ribs along chords that are symmetrical about an axis of symmetry of the washer, with holes being disposed therebetween.

The washer may also include a single opening in the form of a notch extending from its periphery to its center.

The transverse size of the washer may be smaller than the internal transverse side of the enclosure, and the washer may be provided on its periphery with at least two tongues of width such as to bear against the inside periphery of the enclosure, thereby making it easier to keep the washer in place at the end of the enclosure.

BRIEF DESCRIPTION OF THE DRAWINGS

A cylindrical electrochemical cell of the invention is described below by way of example and with reference to the diagrammatic figures of the accompanying drawings.

FIG. 4 is a plan view and FIG. 5 is a diametrical section view on line V—V of FIG. 4 showing a washer having two rectilinear ribs on either side of rows of holes.

FIG. 6 is a plan view and FIG. 7 is a diametrical section view on line VII—VII of FIG. 6 showing a washer analogous to that of FIG. 4, but including four tongues at its periphery to make it easier to hold the washer in place at the end of the enclosure.

FIG. 8 is a plan view and FIG. 9 a diametrical section view on line IX—IX of FIG. 8 showing a washer that does not include any bulges or any holes, but that is pierced by a slot extending from its periphery to its center.

FIG. 10 is a plan view and FIG. 11 is a diametrical section on line XI—XI of FIG. 10 showing a washer analogous to that of FIG. 6 but of smaller diameter and having three tongues at its periphery to make it easier to hold the washer in place at the end of the enclosure.

FIG. 12 is a plan view of a washer that is generally square in outline, having diagonals that are equal to the inside diameter of the enclosure for the purpose of making it easier to hold the washer in place at the end of the enclosure.

MORE DETAILED DESCRIPTION

Figure 1:
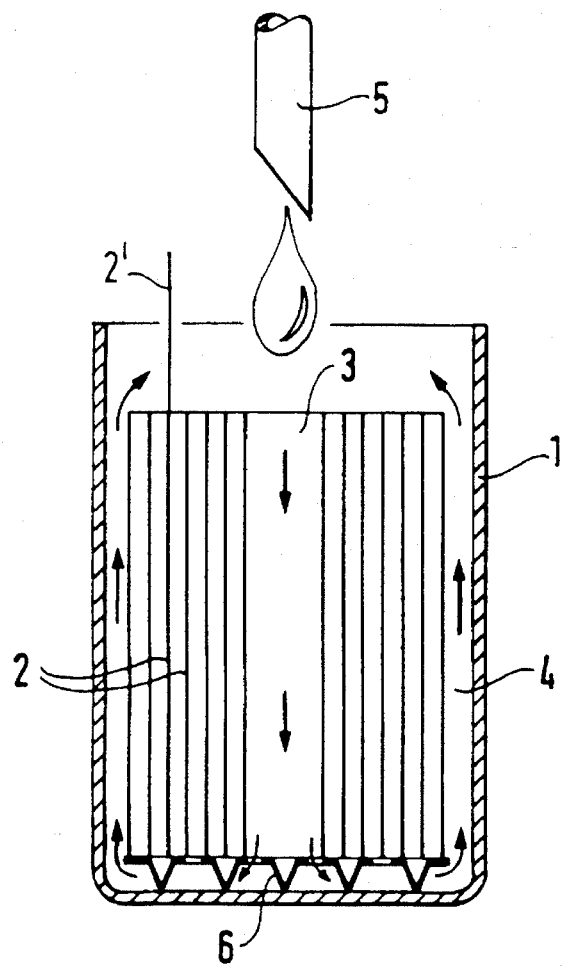
FIG. 1 is an axial section through the cell while it is being filled with electrolyte.

In FIG. 1, the electrochemical cell of the present invention comprises a cylindrical enclosure 1 containing electrodes 2 that are provided with a connection 2' and that are spiral-wound around an axial chimney 3 that is used for filling the cell with electrolyte.

The outer periphery of the spiral-wound set of electrodes is not accurately cylindrical so there remains a duct 4 through which air that has been displaced by the electrolyte can be exhausted. While the electrodes are being spiral-wound, there can be seen a portion of excess thickness on the outside of the resulting reel that is constituted by the ends of the wound electrodes. When such a reel is inserted in a circularly cylindrical enclosure, the set of electrodes leaves a duct due to said extra thickness that extends up the full height of the reel and that allows air to escape. As a result, because the electrodes are rigid, the winding thereof has multiple facets that leave gaps between the turns of the reel, through which it is possible for air or electrolyte to circulate.

The electrolyte is injected from the end of a tube 5 into the axial chimney 3 in which it flows downwards as represented by the arrows. It reaches the end of the enclosure above a washer 6 that is provided with ribs on its bottom face and that is pierced by holes. The electrolyte spreads through the electrodes and also beneath the washer 6 while simultaneously expelling air which is exhausted to the outside via the duct 4.

Figure 2:
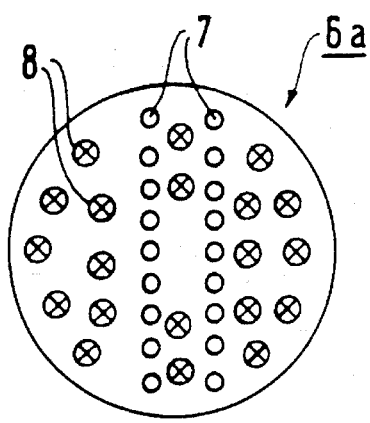
FIG. 2 is a plan view of a washer that makes it easier for the electrolyte at the end of the cell to pass from the center to the periphery, and that also makes it easier to expel air via the periphery of the cell.
Figure 3:
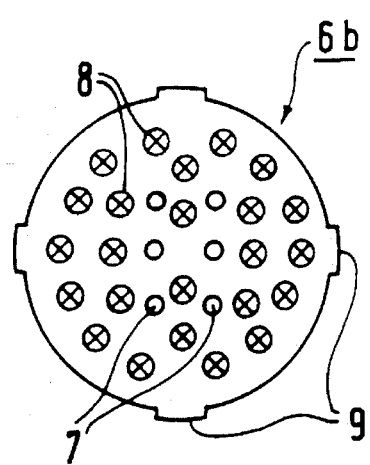
FIG. 3 is a plan view of a washer having a different distribution of bulges and of holes.

As shown in FIGS. 2 and 3, the washer 6a may have holes 7 and bulges 8 where the bulges are presented diagrammatically by circles with crosses drawn in them. Around the major portion of its periphery, the diameter of washer 6b is smaller than the inside diameter of the enclosure, but it has tongues 9 projecting outwards so as to bear against the inside diameter of the enclosure and hold the washer against any displacement that could move it off-center (FIG. 3). The number of holes pierced through the washer may be large relative to the number of bulges (FIG. 2) or considerably smaller than said number (FIG. 3).

The washer 6c shown in FIGS. 4 and 5 has two rectilinear ribs 10 on its bottom face that extend along chords of its circular periphery, which chords are symmetrically disposed about a diametrical plane, and the holes 7 are pierced between the chords. Washer 6d shown in FIGS. 6 and 7 is analogous to that shown in FIGS. 4 and 5 except that its diameter is smaller and it has four tongues disposed at the ends of two perpendicularly crossed diameters. The tongues are designed to bear against the inside wall of the enclosure so as to hold the washer in a centered position against the end of the enclosure.

The washer of FIGS. 8 and 9 is plane and has no bulges or ribs, but it includes a radial notch 11 that extends from its center to its periphery. The opening provided by the notch in the periphery of the washer 6e is preferably located in register with a duct 4, however it could be located anywhere around the reel. The washer 6f of FIGS. 10 and 11 is analogous to that of FIG. 8 and 9 except insofar as it is of smaller diameter and has three tongues disposed at 120° intervals for centering the washer on the bottom of the enclosure.

The washer 6g of FIG. 12 is substantially square in shape with rounded corners and it includes holes 7 and bulges 8. Its shape enables it to be positioned at the end of the enclosure in such a manner as to prevent any radial motion that could move it off-center.

Figure 13:
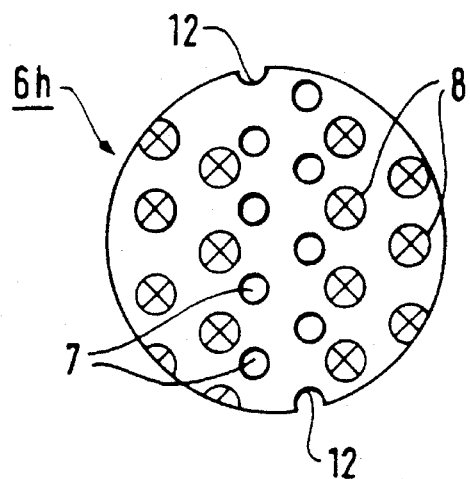
FIG. 13 is a plan view of a washer having a different distribution of bulges and of holes so that its peripheral holes are cut through, thereby forming notches.

Washer 6h in FIG. 13 has notches 12 in its periphery constituted by holes 7 that are partially cut off by the periphery of the washer. The washer 6h also includes bulges 8.

Figure 14:
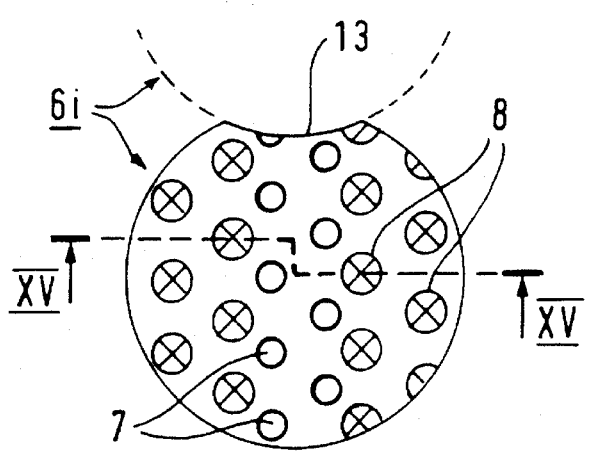
FIG. 14 is a plan view and FIG. 15 is a diametrical section on line XV—XV of FIG. 14 showing a washer that has a broad notch at its periphery.
Figure 15:
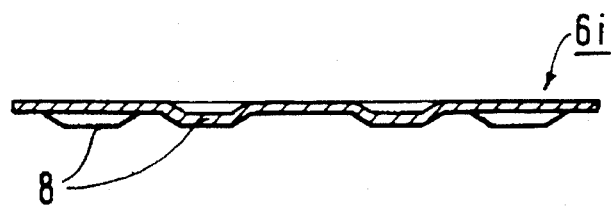

Washer 6i of FIGS. 14 and 15 has holes 7 and bulges 8. A broad notch 13 is provided in the periphery of the washer 6i. This notch 13 is conventionally obtained during the cutting-out process by ensuring that the cut outline overlaps the outline of the previously identical washer 6i to be cut out.

Electrolyte filling tests performed on similar electrochemical cells, some having no washer of the invention and others provided with such a washer have shown that the filling time is reduced from 4 minutes 17 seconds to 1 minute. This avoids polluting the sealing fillet and the outside surface of the enclosure due to overflowing, and also avoids any splashes of fresh electrolyte dropping onto electrolyte that has previously been injected but that has not been absorbed.

Various preferred embodiments are described above, but it will naturally be understood that numerous modifications and variants are possible in the light of the above teaching without going beyond the ambit of the present invention.

We claim:

1. An electrochemical cell having a liquid electrolyte and spiral-wound electrodes placed inside a cylindrical or prismatic enclosure said cell including a filling system comprising:

an axial chimney for electrolyte filling of said spiral-wound electrodes, a duct between an outside periphery of said spiral-wound electrodes and an inside wall of said enclosure in order to exhaust air displaced by the electrolyte, said duct being formed by a portion of excess thickness on the outside of said spiral-wound electrodes, said portion of excess thickness being constituted by the ends of the wound electrodes;

a washer disposed between said enclosure and said spiral-wound electrodes at the end of said chimney that is furthest from the electrolyte inlet, said washer being provided with at least one opening putting said chimney into communication with said duct.

2. A cell according to claim 1, in which said washer is also provided with projections directed towards the end wall of the enclosure.

3. A cell according to claim 1, in which said projections are formed by bulges that alternate with holes.

4. A cell according to claim 1, in which said projections are formed by rectilinear ribs extending along chords that are symmetrically disposed about an axis of symmetry of the washer, and between which holes are disposed.

5. A cell according to claim 1, in which said washer includes holes that are cut through by its periphery, thereby forming notches.

6. A cell according to claim 1, in which said washer includes a broad notch in its periphery.

7. A cell according to claim 1, in which said washer is pierced by a single opening in the form of a notch extending from its periphery to its center.

8. A cell according to claim 1, in which the transverse size of said washer is smaller than the inside transverse size of the enclosure, and the washer is provided on its periphery with at least two tongues of a size enabling them to be bear against the inside wall of the enclosure.

\* \* \* \* \*